United States Patent [19]
Tsai

[11] Patent Number: 5,704,453
[45] Date of Patent: Jan. 6, 1998

[54] BRAKE DEVICE HAVING AN ELBOW FOR GUIDING A BRAKE CABLE

[75] Inventor: Shih Fan Tsai, Chang Hua Hsien, Taiwan

[73] Assignee: Tektro Technology Corporation, Chang Hua Hsien, Taiwan

[21] Appl. No.: 659,154

[22] Filed: Jun. 5, 1996

[51] Int. Cl.⁶ .................................. B62L 1/02; B62L 3/00
[52] U.S. Cl. ............................... 188/24.21; 188/24.12
[58] Field of Search ........................ 188/2 D, 24.11, 188/24.12, 24.21, 24.22

[56] References Cited

U.S. PATENT DOCUMENTS

| | | | |
|---|---|---|---|
| 4,027,746 | 6/1977 | Kine | 188/24.21 |
| 4,770,435 | 9/1988 | Cristie | 188/24.12 |

Primary Examiner—Matthew C. Graham

[57] ABSTRACT

A brake device for a bicycle includes a brake arm and a stud pivotally coupled to the brake arm. The stud includes a ring and a head formed in one end. A casing has an opening and a notch formed in each of the two ends. The ring is rotatably engaged in one of the opening for allowing the casing to be rotatably coupled to the stud. An elbow has an extension for rotatably engaging in the other opening and for allowing the elbow to be rotatable about the extension such that the brake device may be attached to different place of the bicycle.

3 Claims, 5 Drawing Sheets

BRAKE DEVICE HAVING AN ELBOW FOR GUIDING A BRAKE CABLE

BACKGROUND OF THE INVENTION

1. Field of the Invention

The present invention relates to a brake device, and more particularly to a brake device for bicycles.

2. Description of the Prior Art

Typical brake devices for bicycles comprise a pair of brake arms which include an upper portion actuated by a single brake cable. One typical brake device is disclosed in U.S. Pat. No. 5,293,965 to Nagano. However, the brake device is good for mounting on the rear wheel and may not be attached to the other places.

The present invention has arisen to mitigate and/or obviate the afore-described disadvantages of the conventional brake devices for bicycles.

SUMMARY OF THE INVENTION

The primary objective of the present invention is to provide a brake device for bicycles which includes an elbow for allowing the brake cable to be adjusted to different angle and for allowing the brake device to be mounted to various place of the bicycle.

In accordance with one aspect of the invention, there is provided a brake device for a bicycle comprising a brake arm including a lower end for pivotally coupling to the bicycle frame and including an upper end, a stud including a first end pivotally coupled to the upper end of the brake arm at a pivot pin and including a second end having a ring and a head formed thereon, the ring and the head having a size larger than that of the stud, a casing including a first end having a first opening and a first notch formed therein and communicating with each other and including a second end having a second opening and a second notch formed therein and communicating with each other, the first notch including a smaller size than that of the first opening for engaging with the stud and for allowing the ring to be engaged with the opening, the ring including a size slightly larger than that of the first notch and including a size corresponding to that of the first opening for rotatably engaging in the first opening and for preventing the ring from being disengaged from the casing and for allowing the casing to be rotatably coupled to the stud, and an elbow including an extension having a size corresponding to that of the second opening for rotatably engaging in the second opening and for allowing the elbow to be rotatable about the extension.

The upper end of the brake arm includes a channel formed therein so as to define a pair of flanges, the stud includes a block formed in the first end for engaging in the channel and for engaging with the pivot pin.

The upper end of the brake arm includes a bulge formed thereon, the stud includes a groove formed in the first end for engaging in the bulge and for engaging with the pivot pin.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
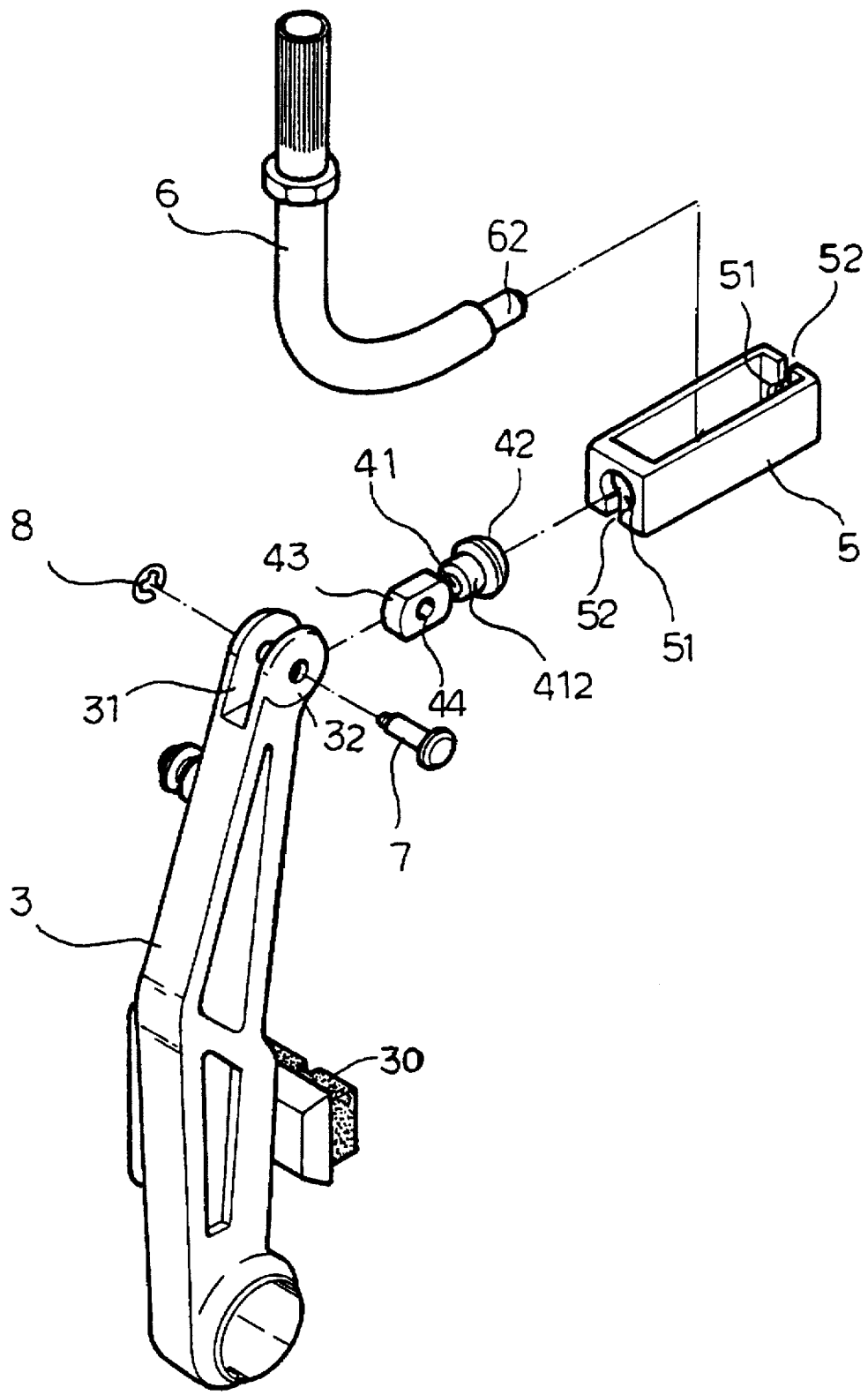
FIG. 1 is an exploded view of a brake device in accordance with the present invention.
Figure 2:
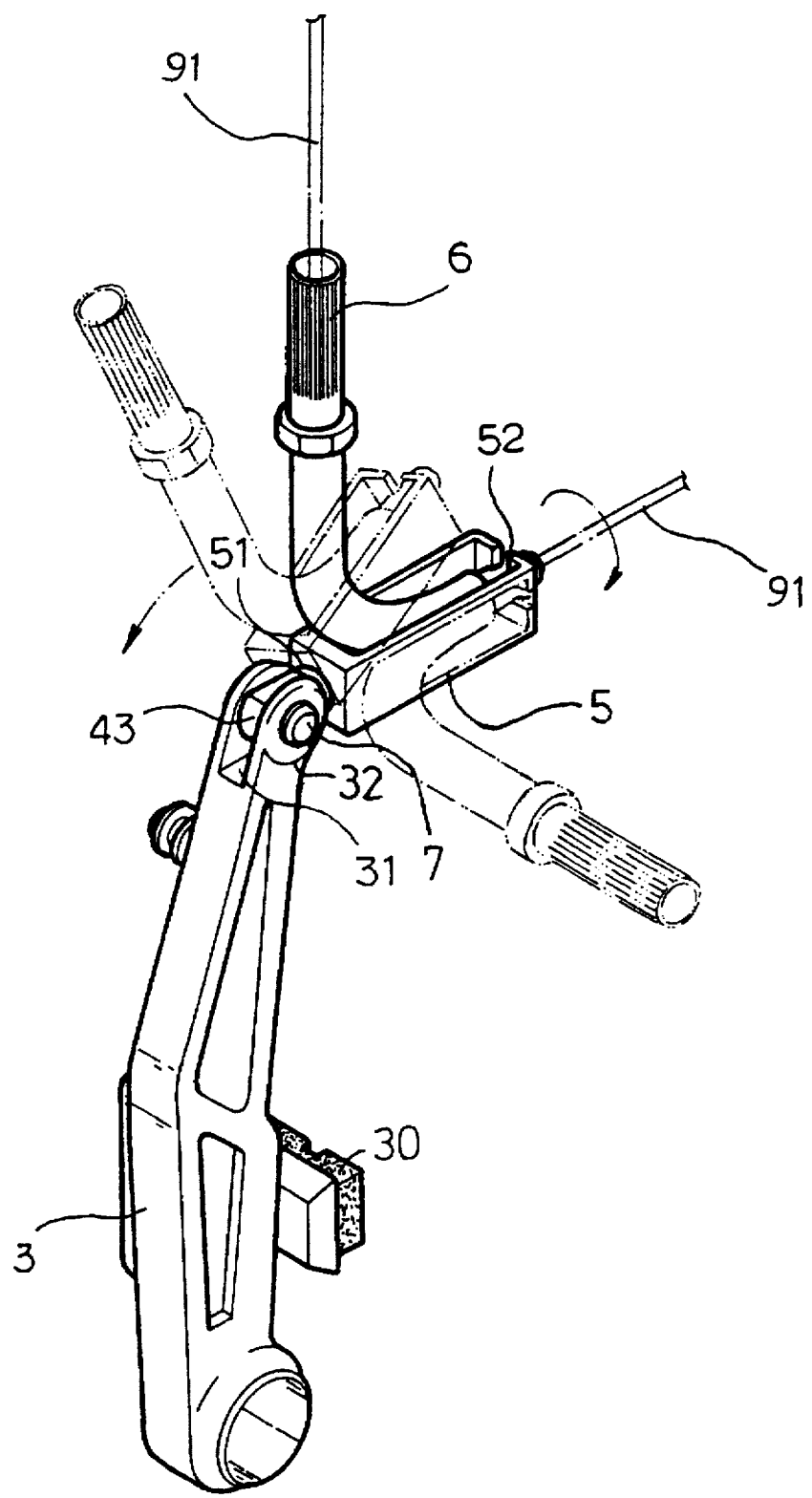
FIG. 2 is a perspective view of the brake device.
Figure 3:
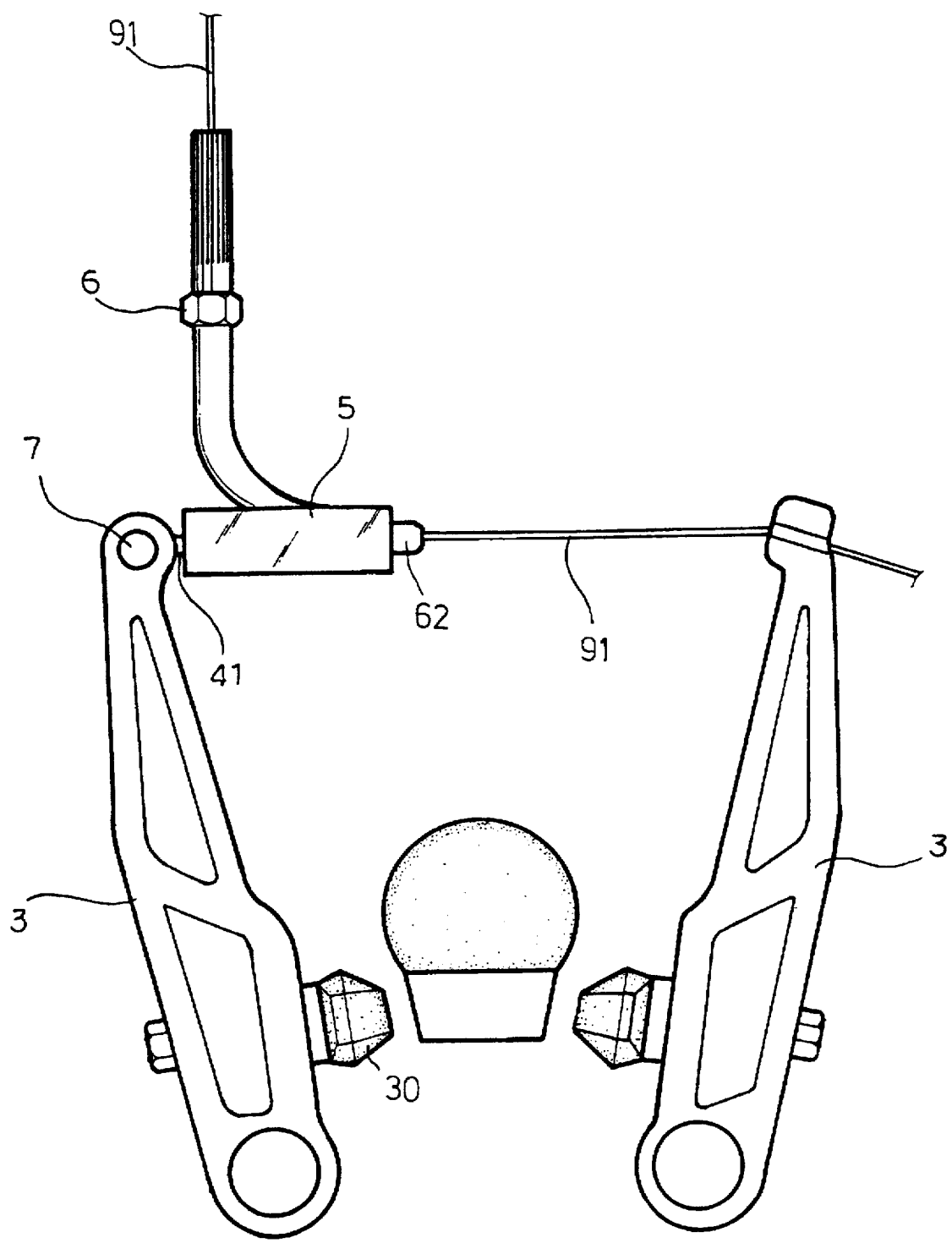
FIG. 3 is a plane view illustrating the operation of the brake device.
Figure 5:
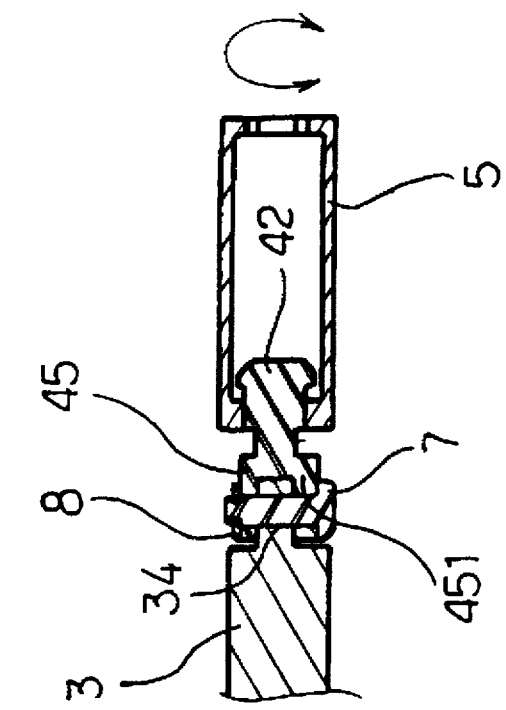
FIGS. 4 and 5 are cross sectional views illustrating two applications of the brake device.
Figure 4:
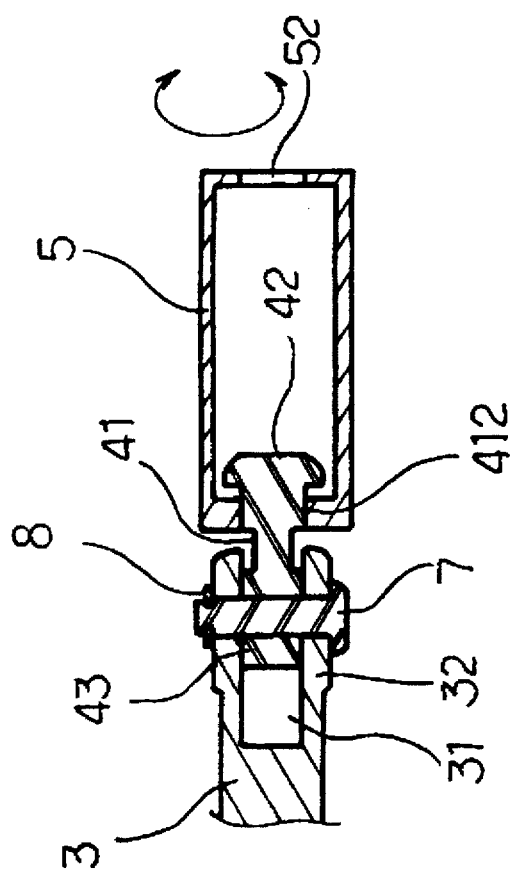

Referring to the drawings, and initially to FIGS. 1 to 4, a brake device in accordance with the present invention comprises a brake arm 3 including a lower end for pivotally coupling to the bicycle frame 90 (FIGS. 6, 7) and including an upper end having a channel 31 formed therein so as to define a pair of flanges 32. A stud 41 includes a block 43 engaged in the channel 31 and having a hole 44 for engaging with a pivot pin 7 such that the stud 41 may be pivotally coupled to the brake arm 3 by the pivot pin 7. A clamping ring 8 is secured to the pivot pin 7 for securing the pivot pin 7 in place. The stud 41 includes a ring 412 and a head 42 formed in the other end opposite to the block 43. Alternatively, as shown in FIG. 5, the brake arm 3 may include a bulge 34 and the stud 41 may include a groove 451 formed therein for engaging with the bulge 34 such that the stud 41 may also be pivotally coupled to the brake arm 3 by the pivot pin 7.

A casing 5 includes two ends each having an opening 51 and a notch 52 formed therein and communicating with each other. The notch 52 includes a smaller size than that of the opening 51 for engaging with the stud 41 and for allowing the stud 41 to be engaged with the opening 51. The ring 412 includes a size slightly larger than that of the notch 52 and includes a size corresponding to that of the opening 51 for rotatably engaging in the opening 51 and for preventing the ring 412 from being disengaged from the casing 5 via the notch 52, best shown in FIG. 4, such that the casing 5 can be rotatably coupled to the stud 41. An elbow 6, for engaging a brake cable 91 therein, includes an extension 62 having a size corresponding to that of the opening 51 for rotatably engaging in the opening 51, such that the elbow 6 may also be rotated about the extension 62, best shown in FIG. 2. The extension 62 may be engaged in the opening 51 after the brake cable is engaged through the notch 52.

Figure 6:
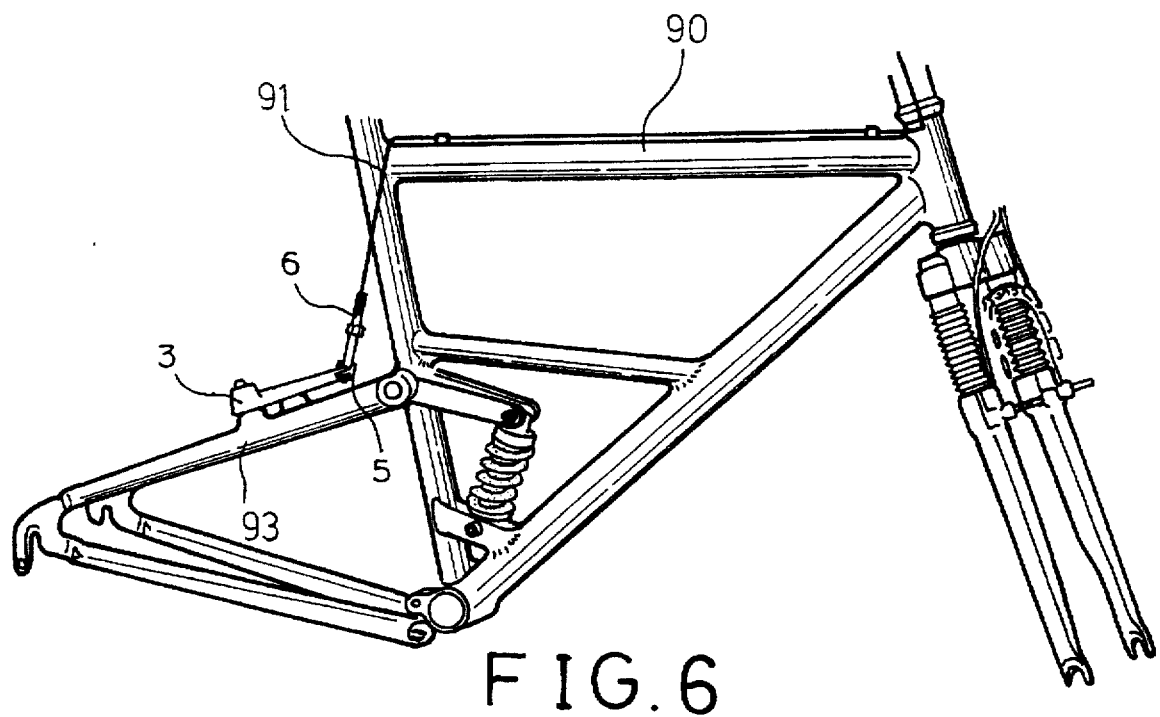
FIGS. 6 and 7 are schematic views illustrating the operations of the brake device.
Figure 7:
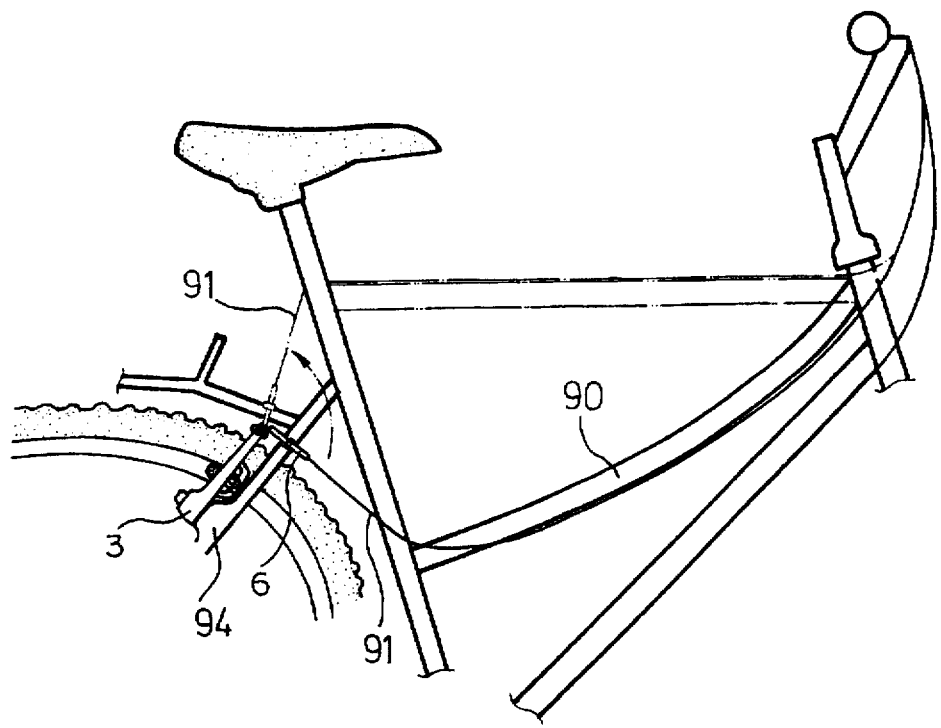

In operation, as shown in FIGS. 6 and 7, the elbow 6 is rotatable about the casing 5 such that the brake device can be attached to the seat stay 93 of less slope (FIG. 6) or attached to the seat stay 94 of larger slope (FIG. 7). In addition, the elbow 6 may be rotated such that the brake cable 91 may be engaged to either the upper portion or the lower portion of the bicycle frame 90 (FIG. 7).

Accordingly, the brake device in accordance with the present invention includes an elbow for allowing the brake cable to be adjusted to different angle and for allowing the brake device to be mounted to various place of the bicycle.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A brake device for a bicycle comprising:
   a brake arm including a lower end for pivotally coupling to the bicycle frame and including an upper end, a stud including a first end pivotally coupled to said upper end of said brake arm at a pivot pin and including a second end having a ring and a head formed thereon, said ring and said head having a size larger than that of said stud, a casing including a first end having a first opening and a first notch formed therein and communicating with each other and including a second end having a second opening and a second notch formed therein and communicating with each other, said first notch including a smaller size than that of said first opening for engaging with said stud and for allowing said ring to be engaged with said opening, said ring including a size slightly larger than that of said first notch and including a size corresponding to that of said first opening for rotatably engaging in said first opening and for preventing said ring from being disengaged from said casing and for allowing said casing to be rotatably coupled to said stud, and an elbow for guiding a brake cable, said elbow including an extension having a size corresponding to that of said second opening for rotatably engaging in said second opening and for allowing said elbow to be rotatable about said extension.

2. A brake device according to claim 1, wherein said upper end of said brake arm includes a channel formed therein so as to define a pair of flanges, sad stud includes a block formed in said first end for engaging in said channel and for engaging with said pivot pin.

3. A brake device according to claim 1, wherein said upper end of said brake arm includes a bulge formed thereon, said stud includes a groove formed in said first end for engaging in said bulge and for engaging with said pivot pin.

* * * * *